United States Patent Office 3,193,541
Patented July 6, 1965

3,193,541
POLYMERIZATION OF VINYL ISOBUTYL ETHER
Arthur D. Ketley, Derwood, Md., assignor to W. R. Grace & Co., New York, N.Y., a corporation of Connecticut
No Drawing. Filed Nov. 15, 1961, Ser. No. 152,647
9 Claims. (Cl. 260—91.1)

This invention relates to the production of crystalline polyvinyl isobutyl ether by cationic polymerization. More particularly, it relates to the use of a frozen boron trifluoride ether complex to produce crystalline polyvinyl isobutyl ether.

In summary, this invention is directed to the production of crystalline polyvinyl isobutyl ether by freezing solid a boron trifluoride ether complex, diluting vinyl isobutyl ether in an inert hydrocarbon which is liquid at a temperature below the freezing point of the boron trifluoride ether complex and contacting the solid boron trifluoride ether complex with the solution of monomer at a temperature below the freezing point of the ether complex.

The use of liquid boron trifluoride ether complex to polymerize vinyl isobutyl ether in a liquid hydrocarbon reaction medium at low temperatures to produce a crystalline polymer is illustrated by C. E. Schildknecht et al., I.E.C. 40, p. 2104 (1948). In applying Schildknecht's technique, I have been able to produce a polyvinyl isobutyl ether only slightly crystalline to X-rays. Surprisingly, I have found that by freezing the boron trifluoride ether complex before contacting it with the monomer solution, a highly crystalline polymer is produced.

In carrying out this invention the boron trifluoride diethyl ether complex is preferred. Other boron trifluoride ether complexes which are suitable include lower dialkyl ethers, e.g. dipropyl ether, ethyl methyl ether, dibutyl ether, diamyl ether and the like.

It is essential that the temperature at which the reaction is effected be below the freezing temperature of the boron trifluoride ether complex. In the case of boron trifluoride diethyl ether, the temperature of the reaction solution should be at least —60° C., or even lower. Such low temperatures are obtained and maintained by the utilization of refrigerants such as solid carbon dioxide, liquefied ethylene and the like.

In order to effectively maintain the desired low reaction temperature, and to prevent the monomer from freezing, diluent hydrocarbons which are liquid at the reaction temperature must be used. Liquefied hydrocarbons, such as liquefied propane, liquefied butane, and chlorinated hydrocarbons such as methylene chloride and the like, are suitable.

For best results, the reaction should be carried out in a dry atmosphere, for example, under dry nitrogen or dry argon. The polymerization may take place conveniently at atmospheric pressure, or at reduced or elevated pressures.

In this invention it is the surface layer of the catalyst which is effective in promoting the polymerization reaction. From this it follows that the amount of catalyst required to produce a given yield will be higher or lower depending on the surface area of the catalyst which is accessible to the monomer reactant. The reaction is carried out successfully by freezing the catalyst solid and dipping it into a pre-cooled hydrocarbon solution of the monomer, or by adding the pre-cooled monomer solution to the frozen catalyst.

After the reaction is completed, it is advisable to deactivate the catalyst, a procedure which will hereinafter be referred to as "quenching." This result is accomplished by treating the catalyst with a suitable quenching agent such as methanol. After quenching, the solid polymer is readily separated and dried to a powder which is crystalline to X-rays.

The invention will be further illustrated by the following examples. All of the examples were carried out under an inert atmosphere of nitrogen. The specific viscosity, $\eta_{sp./c.}$, was measured by dissolving 0.1 g. of the polymer in 100 cc. Decalin at 135° C.

Example 1

20 cc. vinyl isobutyl ether were added to 400 cc. butane and the solution was cooled to a temperature of —78° C. A cooling bath of acetone and solid carbon dioxide was used to attain and maintain the temperature at —78° C. A glass rod was dipped into boron trifluoride diethyl ether and then into liquid nitrogen so that a layer of frozen solid boron trifluoride diethyl ether covered the rod. The catalyst carrying rod was dipped into the pre-cooled butane solution of vinyl isobutyl ether. Extremely rapid polymerization took place until a layer of polymer covered the exposed solid catalyst surface. The rod was pulled out of the solution and dipped in methanol to inactivate the catalyst. The solid polymer was then filtered from the liquid, ground in a Waring Blendor with more methanol to inactivate any residue catalyst, and placed in a vacuum oven to dry. A yield of 14.7 g. of dried polymer in the form of a white powder was obtained. The product was highly crystalline to X-rays and had a specific viscosity of 1.5.

The polymer was pressed into a 20 mil thick film by heating in a Carver press for 3 minutes at 350° F. under a pressure of 500 p.s.i. The film was tough and flexible at room temperature.

Example 2

Boron trifluoride diethyl ether was poured into a 500 cc. Erylenmeyer flask so as to just cover the bottom of the flask. The layer of catalyst was frozen solid by placing the flask in liquid nitrogen. A solution of 25 cc. vinyl isobutyl ether and 250 cc. butane, pre-cooled to —78° C., was poured into the flask and the whole immersed in a cooling bath of acetone and solid carbon dioxide maintained at a temperature of —78° C. A layer of polymer formed rapidly over the surface of the frozen catalyst. The reaction mixture was left over night and then filtered. The solid polymer was washed with methanol to quench the catalyst, filtered and ground in a Waring Blendor with more methanol to remove any residue of catalyst. After filtration, the polymer was placed in a vacuum oven to dry. The dried polymer was in the form of a white powder which was highly crystalline to X-rays.

Example 3

This example uses the Schildknecht method (discussed above), in which liquid $BF_3$-etherate catalyst is used, which method gives predominantly a non-crystalline product.

45 cc. of vinyl isobutyl ether were added to 250 cc. of butane and the solution was cooled to a temperature of —78° C. A cooling bath of acetone and solid carbon dioxide was used to maintain the temperature at —78° C. 0.5 cc. of boron trifluoride diethyl ether were slowly added to the monomer solution dropwise. Although the complex partially froze after having been in sufficient contact with the cold monomer, the initial monomer-complex contact was liquid-liquid and, therefore, polymerization proceeded slowly, and very little crystalline material was formed. The reaction mixture was left one hour and then filtered. The solid polymer was washed with methanol to remove any residue of catalyst. After filtration, the polymer was placed in a vacuum oven to dry. A yield of 21.5 g. of dried polymer in the form of a rubbery solid was obtained. The product was only slightly crystalline to X-rays and had a specific viscosity of 0.73.

An attempt was made to press the polymer into a film but the polymer decomposed upon being heated to a temperature of 150° F.

The polyvinyl isobutyl ether of this invention is useful for making strong, tough films. It is also useful as a protective surface coating and forming laminates.

I claim:

1. The method of producing crystalline polyvinyl isobutyl ether which comprises preforming a catalyst by freezing solid a boron trifluoride ether complex, diluting vinyl isobutyl ether monomer in an inert solvent which is liquid at a temperature below the freezing point of the said boron trifluoride ether complex, and contacting the said frozen solid boron trifluoride ether complex with the solution of monomer at a temperature below the freezing point of the boron trifluoride ether complex.

2. The process according to claim 1 wherein the boron trifluoride ether complex is boron trifluoride diethyl ether.

3. The process according to claim 1 wherein the process is carried out under a substantially dry atmosphere.

4. The process according to claim 1 wherein the solvent is butane.

5. The process according to claim 1 wherein the process is carried out at atmospheric pressure.

6. The method of preparing crystalline polyvinyl isobutyl ether according to claim 1 comprising contacting a solution of vinyl isobutyl ether in an inert solvent having a temperature of not greater than about −60° C. with a preformed catalyst prepared by freezing a complex of boron trifluoride with a lower dialkyl ether.

7. The method according to claim 6 in which the catalyst is dipped into the vinyl isobutyl ether solution.

8. The method according to claim 6 in which the lower dialkyl ether is diethyl ether and the solvent is butane.

9. The method of preparing crystalline polyvinyl isobutyl ether according to claim 6 comprising adding a solution of vinyl isobutyl ether in a hydrocarbon solvent precooled to at least about −78° C. to a solid preformed frozen boron trifluoride ether complex.

References Cited by the Examiner

UNITED STATES PATENTS 2,616,879    11/52    Zoss _____ 260—91.1

OTHER REFERENCES

Dunphy et al.: J. Poly. Sci., 46, 542 (1960).

JOSEPH L. SCHOFER, *Primary Examiner.*

H. N. BURSTEIN, WILLIAM H. SHORT, *Examiners.*